July 12, 1932. E. F. W. ALEXANDERSON 1,867,396
ALTERNATING CURRENT COMMUTATOR MACHINE
Filed Nov. 30, 1929
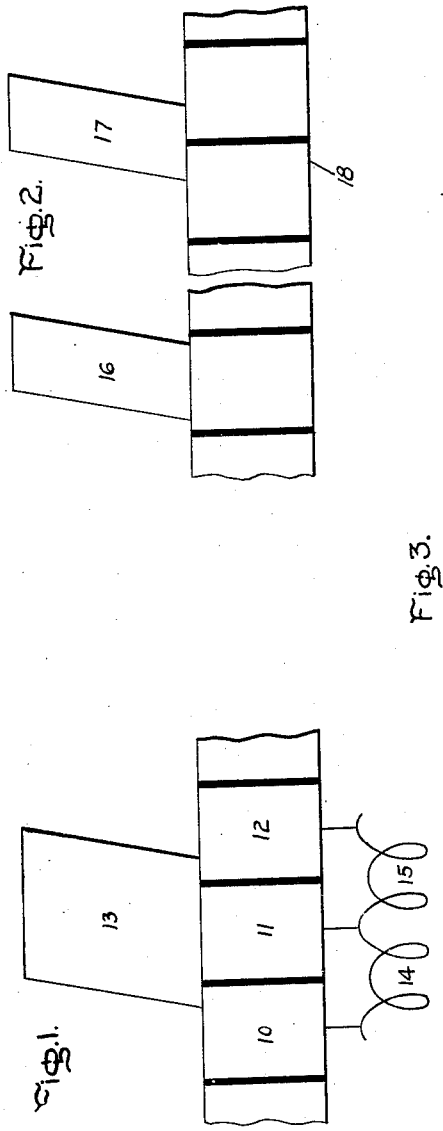
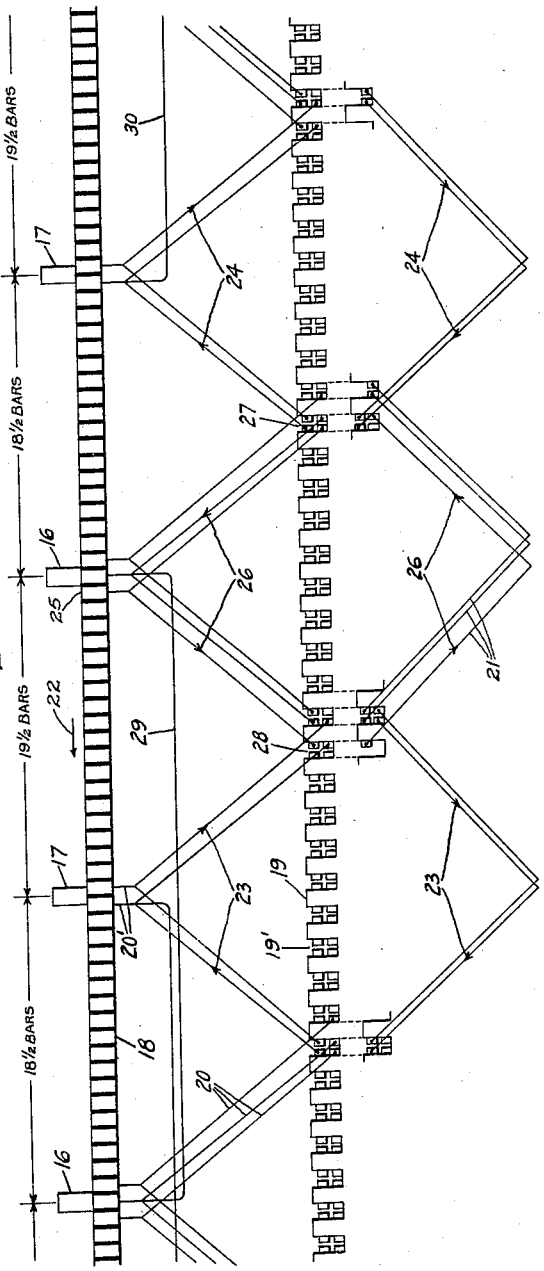
Inventor:
Ernst F. W. Alexanderson,
by Charles E. Tullar
His Attorney.

Patented July 12, 1932

1,867,396

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

ALTERNATING CURRENT COMMUTATOR MACHINE

Application filed November 30, 1929. Serial No. 410,798.

My invention relates to commutator dynamo-electric machines, and has for its main object to improve commutating conditions by reducing the volume of the short circuit current allowed to flow at the brushes.

While my invention is applicable to any dynamo-electric machine of the commutator type in which it is important to limit the volume of the short circuit current in the coils which are short-circuited by the commutator brushes, it is particularly applicable to alternating current commutator motors in which special problems arise by reason of the currents induced by transformer action in the coils which are short-circuited by the commutator brushes, particularly at starting.

Alternating current dynamo-electric machines of the commutator type are sometimes subject to load while at standstill or at very low speeds. As an example, an alternating current railway motor is subject to heavy loads during starting and may often be subject to load while at standstill for several minutes. Alternating current dynamo-electric machines of the commutator type as heretofore designed have not been capable of delivering prolonged torque at standstill owing to the excessive heating of the commutator brushes due to the flow therethrough of the excessive transformer current in the armature coils which are short-circuited in series when a brush spans more than two commutator segments. The natural thing to do to overcome this defect would seem to be to diminish the width of the brushes so as to short circuit a lesser number of commutator bars.

The increasing importance of alternating current railway electrification and the otherwise general satisfactory performance of the alternating current railway motor of the commutator type for this class of service has made it very desirable to overcome the above mentioned limitation without destroying satisfactory commutation while running. However, successful commutation during running necessitates the absorption of the inductive energy stored in the coil undergoing commutation at the instant connection between such coil and the commutator brush is broken. The only practicable way heretofore devised for absorbing this energy so as to avoid injurious sparking is to provide a short-circuited path in close inductive relation to the coil undergoing commutation by making the commutator brushes wide enough so as to bridge a minimum of three commutator segments. In this way a short-circuited path is formed adjacent to the coil undergoing commutation before its own short circuit through the brush is broken. It would appear therefore that if we diminish the width of the brushes so as to avoid excessive heating due to short circuit currents at standstill we will destroy the satisfactory commutation at running speeds.

I have discovered that by employing narrower brushes and slightly rearranging their spacing I can avoid the excessive brush heating at standstill and still retain an inductive path for the coil undergoing commutation and so obtain satisfactory commutation at running speeds. I accomplish this result by providing a short-circuited path through one brush for absorbing the inductive kick released at another brush, such brushes being located at different points on the commutator. The problems involved and a preferred solution will be more fully explained in connection with the accompanying drawing which illustrates in Fig. 1 the usual commutating arrangement of the prior art for the purpose of more clearly explaining the invention; Fig. 2 illustrates a detail view of the relative size of brushes and commutator segments as well as the relative positions thereof at different commutation points in accordance with my invention; and Fig. 3 represents the brush, commutator and armature coil arrangement of a four-pole machine incorporating my invention. The features of the invention which are considered to be novel and patentable will be pointed out in the claims appended hereto.

Before explaining the invention in detail a brief history leading up to its development will be helpful to its understanding. The principal difficulty in the design of alternating current commutator motors and particularly single phase railway commutator motors is the problem of starting. This is because at standstill a voltage is induced in each coil of the armature due to the alternating character of the field flux and this voltage is short-circuited by the brushes. Because of this, if a motor of the design used heretofore is held at standstill for a period of about a minute, the brushes will become red hot and damage the commutator as well as causing a serious fire hazard. In order to minimize this difficulty certain European single phase railroads have adopted a frequency of 16⅔ cycles. This makes the starting conditions easier but yet it is not possible to hold these motors while energized for as long a period as one minute at standstill without damage. In the United States 25 cycle energy has been generally adopted for alternating current railway electrification and this makes the problem even more difficult.

I have found that if a carbon brush is placed across a pair of commutator bars on which a variable voltage is impressed the short circuit current is negligible and no serious heating is encountered until the voltage exceeds about four volts. When this voltage is exceeded the current rises very rapidly while the contact resistance decreases so that the flow of current becomes unstable and the brushes rapidly become hot. From repeated tests of this character it was found that if the voltage short circuited by the brushes could be held below about four volts, the short circuiting effect by the brushes would be of no consequence and that a commutator motor might be held at standstill under these conditions for a period of several minutes without any harmful effects.

In standard alternating current motors the relative dimensions of the brushes and the commutator bars are such that the brushes short circuit two or three armature coils. In working with a 500 H. P., 25 cycle, single phase railway motor a brush width was tried which short-circuited two coils as shown in Fig. 1 and during starting the voltage induced in each coil was about four volts giving a total of eight volts between two segments which were simultaneously in contact with the brush. The brushes became glowing hot while the motor was at standstill demonstrating the difficulty met with in the existing type of alternating current commutator motors where conditions are such as to require a standstill excited condition for any appreciable length of time. On the other hand, I found that when the commutator brush spanned only two commutator segments no undue heating occurred.

From these tests I concluded that if it were possible to design a motor in such a way that the brush would never short circuit more than one armature coil at a time it would be possible to maintain four volts on the armature coils at standstill without harm. Accordingly I experimented with another motor armature in which the thickness of the commutator segments plus the two mica spacers between segments was equal to the thickness of the brush so that the brush would never short circuit more than one coil at a time. The standstill test of this motor came out according to expectations and the motor could be maintained for several minutes at standstill without distress. At full speed however the commutation was very poor because as I discovered the motor design did not fulfill the fundamental conditions on which the generally accepted theory of commutation is based. This theory briefly prescribes that the brush should short circuit two to three of the coils at the same time so that these coils always form an inductive short circuit for each other. Thus in Fig. when segment 10 passes from beneath the brush 13 the energy of the current flowing in the short circuited armature coil 14 is inductively transferred and dissipated in the short circuit path formed through coil 15, segments 11 and 12, and brush 13. Serious sparking between segment 10 and brush 13, when this contact is broken, is therefore avoided because of the inductive short circuit through coil 15. It is at once apparent that this condition did not exist in the experimental motor last mentioned above and that this accounted for the serious sparking experienced at full speed.

It is now seen that to obtain an alternating commutator motor that will withstand prolonged standstill excitation and have successful commutation at running speeds requires brushes that will not short-circuit more than one armature coil at a time to satisfy the first condition and some new way to inductively absorb the energy of the coils undergoing commutation to satisfy the second condition at running speeds. The solution of this problem constitutes the subject matter of the present invention and a preferred embodiment of the invention is illustrated in Fig. 3. The invention is illustrated as applied to a 4-pole motor having 9½ slots and 19 commutator segments per pole and 2 coils per slot. In the drawing, 16 and 17 represent what we may term for the sake of convenience the positive and negative brushes respectively. The commutator is represented at 18 and is represented as laid out flat. 19 represents the armature teeth and 19' the slots each containing four coil sides. 20 represents coil end connections at the commutator end of the armature and 20' the connections to the commutator segments. 21 represents end connections for coils at the back end of the armature or the end away from the commutator.

It will be noted that the commutator brushes do not exceed a width greater than the combined width of a commutator segment plus the width of two insulating strips between segments. The brushes may be narrower than this as shown for example in Fig. 2 but they must not exceed this width, otherwise they will contact with more than two segments and short-circuit more than one armature coil. Thus, the required condition for preventing excessive heating of the brushes under standstill torque conditions is fulfilled, it being understood that the motor design is such that the standstill voltage between segments does not exceed about four volts where ordinary carbon brushes are employed.

It will be seen that the four brushes are not equally spaced but the positive and negative brushes are displaced relative to each other slightly from an even spacing by a distance such that the positive brushes contact with only one commutator segment at the same time that the negative brushes bridge two adjacent segments and vice versa. The exact spacing of the brushes to fulfill this condition will depend upon the number of commutator segments per pole. In the present motor there are 19 segments per pole so that the brushes are alternately spaced 18½ and 19½ commutator segments apart between brush centers. Brushes 17, thus short circuit certain armature coils at the instant when brushes 16 are resting on only one commutator segment. At another instant, brushes 16 will short circuit certain armature coils when brushes 17 are contacting with only one segment. At other times both sets of brushes will short circuit armature coils but at no time will there occur a condition when no armature coils are short circuited such as would be the case if the brushes were equally spaced. Thus, although the brush width is not sufficient to bridge three adjacent commutator segments there will always be one or more coils of the armature which are short-circuited.

The coils which are short-circuited at the instant when an inductive circuit is required to absorb the energy of other coils undergoing commutation form an inductive short-circuit for such other coils. This is true since the coils spanned by the positive and negative brushes are adjacent to each other in the same or adjacent slots and therefore the negative coils serve as the desired inductive short-circuit for the positive coils and vice versa.

Referring to Fig. 3, arrow 22 may indicate the direction of movement of the commutator. At the instant indicated the brushes 17 form short-circuits with armature coils connected thereto through the commutator segments, as indicated by arrows 23 and 24. Commutator segment 25 has just broken contact with brush 16 and has interrupted a short-circuit indicated by arrows 26 the energy of which must be dissipated inductively. It will be noted that the last mentioned short-circuit occurred through a slot at 27 in which there now exists another short-circuit 24 and through a slot at 28 next adjacent to a slot in which the short-circuit 23 now exists. Because of this close inductive relation the energy stored in the fluxes due to the now interrupted short-circuits 26 are largely absorbed in producing currents in the two adjacent short-circuits 23 and 24. The same condition exists with all other coils undergoing commutation and thus the arrangement satisfies the requirements of good commutation at running speeds. Thus brushes 17 complete the short-circuits necessary to absorb the inductive kick of the coils undergoing commutation at the alternate pair of brushes 16 and vice versa. Equalizer connections between points of the same voltage and polarity may be employed as usual and two such equalizer connections are indicated at 29 and 30. They will have the same beneficial equalizing function with respect to the commutation short circuits as for usual purposes.

It will be observed that the coil arrangement of the armature is a usual one using full pitch coils. There are various different types of armature windings and connections using full pitch or approximately full pitch coils in which sides of coils connected to a positive brush are in fairly close proximity to coil sides in contact with a negative brush and vice versa. Any armature winding arrangement that provides a short-circuited path through the positive brush or brushes to dissipate the inductive kick of the coils undergoing commutation at the negative brush or brushes or vice versa can be employed with my invention.

Although particularly useful in connection with alternating current dynamo electric machines there is no reason why the invention cannot be applied to direct current commutator machines, for instance with machines having a relatively high voltage between commutator segments or where for any other reason it is desirable to use narrow brushes.

I have found that a motor built in accordance with my invention, namely with brushes that contact with not more than two commutator segments at any time and with the positive and negative brushes alternately displaced slightly from their usual positions to the extent necessary to have the positive brushes form short-circuits which relieve commutation stresses at the negative brushes and vice versa, gives excellent results both at standstill and running. Under standstill excitation no appreciable heating of the brushes occurred and during running the motor gave excellent commutation, behaving in every way like a normal commutating motor in which the brushes are wide enough to short-circuit several coils. The motor was in other respects of standard design. Where commutating poles are employed it will perhaps be desirable to make the commutating zones slightly wider than usual, but it will be noted that the brush displacement is so small that there should be no difficulty in employing commutating poles, particularly where the number of commutator segments per pole is relatively large since this makes the necessary brush displacement relatively less per pole arc.

I have shown my invention applied to a machine having such number of commutator segments per pole that a slight displacement of the brushes from an even spacing is necessary. If I designed the machine with 19½ segments per pole for example the invention would require an even spacing of the brushes in order to fulfill the requirement that the positive brush shall stand in the middle of a bar when the negative brush stands on the division line between two bars. Such design is of course intended to be included in the invention as claimed.

In accordance with the provisions of the patent statutes I have described the principle of operation of my invention, and the manner of applying the same to a particular machine which I now consider to represent the best embodiment thereof, but I desire to have it understood that the arrangement shown and described is only illustrative.

What I claim as new and desire to secure by Letters Patent of the United States is:

1. An alternating current dynamo-electric machine of the commutator type subject to load for appreciable durations under stand-still conditions, having its armature coils so disposed that coils connected to brushes displaced from each other by substantially 180 electrical degrees will be in inductive relation, and provided with armature brushes of a width such as to permit contact with not more than two commutator segments at any instant, and so disposed on the commutator that when a commutator segment breaks contact with a brush of one polarity a brush of another polarity will be in engagement with two commutator segments, the voltage between adjacent commutator segments at the brush positions being such in relation to the resistance of the brushes that undesirable heating of the brushes is avoided under stand-still load conditions.

2. An alternating current dynamo-electric machine of the commutator type, having an armature winding comprising approximately full pitch armature coils, a commutator connected thereto, brushes bearing on said commutator, each brush being of a width such as to permit contact with not more than two commutator segments at any instant, and so disposed on the commutator that when a commutator segment breaks contact with a brush of one polarity a brush of another polarity will be in engagement with two commutator segments, said machine being subject to load for an appreciable duration under stand-still conditions and having a voltage between adjacent commutator segments at the brush positions so related to the resistance of the brushes that excessive heating of such brushes is avoided under such conditions.

3. A dynamo-electric machine of the commutator type having a commutator, positive and negative brushes resting on said commutator at their respective commutation points, said brushes having a width such as not to contact with more than two adjacent commutator segments simultaneously, the spacing between a brush of one polarity and the two adjacent brushes of the opposite polarity differing from an equal spacing by substantially one-half the width of a commutator segment.

4. An alternating current dynamo-electric machine of the commutator type having substantially full pitch armature coils connected to the commutator, commutator brushes resting on the commutator, said brushes having a width such as to permit contact with not more than two commutator segments at any instant, and so disposed with reference to the commutator segments that at least one armature coil per pair of poles is short circuited by a brush at all times, said machine being subject to load for an appreciable duration under stand-still conditions and having a voltage between adjacent commutator segments at the brush positions so related to the resistance of the brushes that excessive heating of such brushes is avoided under such conditions.

5. An alternating current dynamo-electric machine subject to load for an appreciable duration under stand-still conditions having a coil wound armature connected to a commutator, brushes resting on said commutator, the brushes being sufficiently narrow as to make contact with not more than two adjacent commutator segments at one time, the voltage per coil being so related to the resistance of the brushes that when the motor is energized at standstill the voltage induced in an armature coil short-circuited by a brush will not be sufficient to cause excessive heating of such brush, the brushes at consecutive commutation points being spaced from each other so as to short-circuit armature coils at different times whereby when the machine is running there will always be at least one armature coil per pair of poles which is short-circuited, such short-circuited coil or coils serving to absorb the inductive kick energy of other coils undergoing commutation.

6. An alternating current dynamo-electric machine having a commutator, brushes resting on said commutator having such width with respect to the commutator segments that not more than two segments contact with a brush at any time, the brushes at alternate commutating points being unequally spaced apart from the intermediate brush such that when one brush is contacting with only one commutator segment the brush at the adjacent commutating point is contacting with two segments, and armature coils connected to the segments at adjacent commutating points having coil sides in close inductive relation with each other.

7. In an alternating motor of the commutator type, the method of preventing excessive heating of the commutator brushes when the motor is energized at standstill which consists in maintaining the induced armature voltage below about four volts per coil and short circuiting not more than one armature coil per pair of poles through a commutator brush at any one time.

In witness whereof, I have hereunto set my hand this 29th day of November, 1929.

ERNST F. W. ALEXANDERSON.